United States Patent
Kraft et al.

(10) Patent No.: US 12,528,973 B2
(45) Date of Patent: Jan. 20, 2026

(54) COMPOSITION AND METHOD FOR SILICON OXIDE AND CARBON DOPED SILICON OXIDE CMP

(71) Applicant: CMC Materials, Inc., Aurora, IL (US)

(72) Inventors: Steven Kraft, Elgin, IL (US); Fernando Hung Low, Naperville, IL (US); Sudeep Pallikkara Kuttiatoor, Naperville, IL (US); Sarah Brosnan, St. Charles, IL (US); Brian Reiss, Woodridge, IL (US); Sajo Naik, Naperville, IL (US)

(73) Assignee: CMC Materials LLC, Aurora, IL (US)

( * ) Notice: Subject to any disclaimer, the term of this patent is extended or adjusted under 35 U.S.C. 154(b) by 435 days.

(21) Appl. No.: 17/077,295

(22) Filed: Oct. 22, 2020

(65) Prior Publication Data

US 2021/0115300 A1    Apr. 22, 2021

Related U.S. Application Data

(60) Provisional application No. 62/924,332, filed on Oct. 22, 2019.

(51) Int. Cl.
   *C09G 1/02* (2006.01)
   *B24B 37/04* (2012.01)
   *C09K 3/14* (2006.01)

(52) U.S. Cl.
   CPC .............. *C09G 1/02* (2013.01); *B24B 37/044* (2013.01); *C09K 3/1409* (2013.01)

(58) Field of Classification Search
   None
   See application file for complete search history.

(56) References Cited

U.S. PATENT DOCUMENTS

| | | | |
|---|---|---|---|
| 6,626,968 B2 | 9/2003 | Park | |
| 9,070,632 B2 | 6/2015 | Raman et al. | |
| 2003/0121214 A1* | 7/2003 | Ishibashi | G11B 5/8404 106/3 |
| 2004/0223898 A1* | 11/2004 | Ota | C01F 17/235 423/263 |
| 2006/0144824 A1 | 7/2006 | Carter et al. | |
| 2010/0003897 A1 | 1/2010 | Kim et al. | |
| 2011/0045671 A1 | 2/2011 | Behrens et al. | |
| 2014/0349483 A1* | 11/2014 | Li | H01L 21/31053 438/693 |
| 2017/0166778 A1* | 6/2017 | Lauter | C09G 1/18 |
| 2017/0183539 A1* | 6/2017 | Kwon | C09K 3/1409 |
| 2017/0183540 A1* | 6/2017 | Hains | C09G 1/02 |
| 2017/0194160 A1* | 7/2017 | Pallikkara Kuttiatoor | C09G 1/02 |
| 2018/0244956 A1* | 8/2018 | Hains | H01L 21/31053 |
| 2018/0291245 A1* | 10/2018 | Masuda | C01F 17/247 |
| 2020/0198982 A1* | 6/2020 | Suda | C09G 1/02 |

FOREIGN PATENT DOCUMENTS

| | | |
|---|---|---|
| CN | 105229110 A | 1/2016 |
| KR | 1020170073587 A | 6/2017 |
| KR | 1020180068424 A | 6/2018 |
| KR | 20190074597 A | 6/2019 |
| KR | 1020190080616 A | 7/2019 |
| WO | 2014189684 A | 11/2014 |
| WO | 2014189684 A1 | 11/2014 |
| WO | 2017120396 A1 | 7/2017 |
| WO | 2018194792 A1 | 10/2018 |
| WO | 2018229005 A1 | 12/2018 |

OTHER PUBLICATIONS

Korean Intellectual Property Office / ISA, International Search Report and Written Opinion of the International Searching Authority issued in connection with Application No. PCT/US2020/056788 on Feb. 5, 2021.
Taiwan Intellectual Property Office, Search Report issued in connection with Taiwan Patent Application No. 109136768 on Jun. 4, 2021.
China National Intellectual Property Administration, Office Action issued in connection with CN202080073926.7 on Nov. 17, 2022.
Third Party Observations received in counterpart European Application No. 20879343.0, mail date of Office Action Apr. 14, 2023.
English translation of Office Action issued in Chinese counterpart application No. 202080073926.7, mail date of Office Action Apr. 19, 2023.

* cited by examiner

*Primary Examiner* — Shamim Ahmed

(57) ABSTRACT

A chemical mechanical polishing composition for polishing a substrate having a silicon oxygen material includes a liquid carrier, cubiform ceria abrasive particles dispersed in the liquid carrier, and an organic diacid.

16 Claims, 3 Drawing Sheets

COMPOSITION AND METHOD FOR SILICON OXIDE AND CARBON DOPED SILICON OXIDE CMP

CROSS REFERENCE TO RELATED APPLICATIONS

This application claims the benefit of U.S. Provisional Application Ser. No. 62/924,332 entitled Composition and Method for Silicon Oxide and Carbon Doped Silicon Oxide CMP, filed Oct. 22, 2019.

BACKGROUND OF THE INVENTION

Chemical mechanical polishing is a key enabling technology in integrated circuit (IC) and micro-electro-mechanical systems (MEMS) fabrication. CMP compositions and methods for polishing (or planarizing) the surface of a substrate (such as a wafer) are well known in the art. Polishing compositions (also known as polishing slurries, CMP slurries, and CMP compositions) commonly include abrasive particles suspended (dispersed) in an aqueous solution and chemical additives for increasing the rate of material removal, improving planarization efficiency, and/or reducing defectivity during a CMP operation.

Cerium oxide (ceria) abrasives are well known in the industry, particularly for polishing silicon containing substrates, for example, including silicon oxide materials, such as tetraethylorthosilicate (TEOS), silicon nitride, and/or polysilicon. Ceria abrasive compositions are commonly used in advanced dielectric applications, for example including shallow trench isolation applications. While the use of ceria abrasives is known, there remains a need for improved ceria abrasive based CMP compositions. In particular, there remains a need for CMP compositions that provide improved removal rates and improved planarization (e.g., reduced erosion and dishing). The further remains a need for compositions providing removal rate selectivity of one silicon containing material to another (e.g., silicon oxide to silicon nitride selectivity or silicon oxide to polysilicon selectivity).

BRIEF SUMMARY OF THE INVENTION

A chemical mechanical polishing composition for polishing a substrate having a silicon oxygen material (such as silicon oxide) and/or a carbon doped silicon oxygen material is disclosed. In one embodiment, the polishing composition comprises, consists of, or consists essentially of a liquid carrier, cubiform ceria abrasive particles dispersed in the liquid carrier, and an organic diacid.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION OF THE INVENTION

A chemical mechanical polishing composition for polishing a substrate having a silicon oxygen material (such as silicon oxide) and/or a carbon doped silicon oxygen material is disclosed. The polishing composition comprises, consists of, or consists essentially of a liquid carrier, cubiform ceria abrasive particles dispersed in the liquid carrier, and an organic diacid. In one embodiment, the organic diacid includes a linear saturated dicarboxylic acid or a polyethylene glycol diacid.

The disclosed polishing compositions and corresponding (CMP methods) may confer significant and unexpected advantages. For example, the disclosed compositions may provide significantly improved silicon oxide removal rates and may therefore improve throughput and save time and money. The disclosed compositions may further provide reduced polysilicon removal rates and a significantly improved silicon oxide to polysilicon selectivity. The disclosed composition may further provide improved dishing and erosion over a wide range pattern features and densities. Certain embodiments may further provide significantly improved removal rates when polishing carbon doped silicon oxide materials.

The polishing composition contains abrasive particles including cubiform cerium oxide abrasive particles suspended in a liquid carrier. By "cubiform" it is meant that the ceria abrasive particles are in the form or shape of a cube, i.e., substantially cubic. Stated another way, the cubiform ceria abrasive particles are cubic in form or nature. However, it will be understood that the edge dimensions, corners, and corner angles need not be exactly or precisely those of a perfect cube. For example, the cubiform abrasive particles may have slightly rounded or chipped corners, slightly rounded edges, edge dimensions that are not exactly equal to one another, corner angles that are not exactly 90 degrees, and/or other minor irregularities and still retain the basic form of cube. One of ordinary skill in the art will be readily able to recognize (e.g., via scanning electron microscopy or transmission electron microscopy) that the cubiform ceria abrasive particles are cubic in form with tolerances generally allowed for particle growth and deagglomeration.

Figure 1:
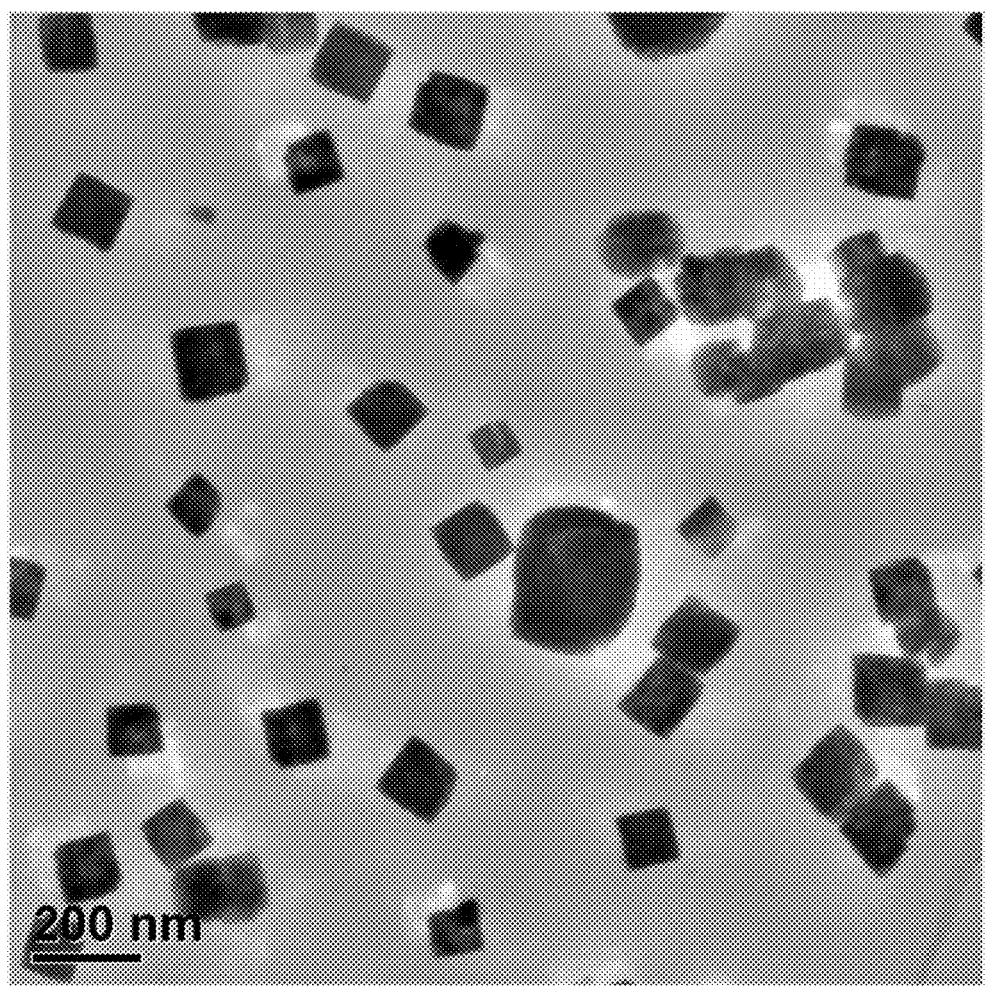
FIGS. 1 and 2 depict transmission electron microscopy (TEM) micrographs of a cubiform ceria abrasive sample showing ceria abrasive particles having square faces.
Figure 2:
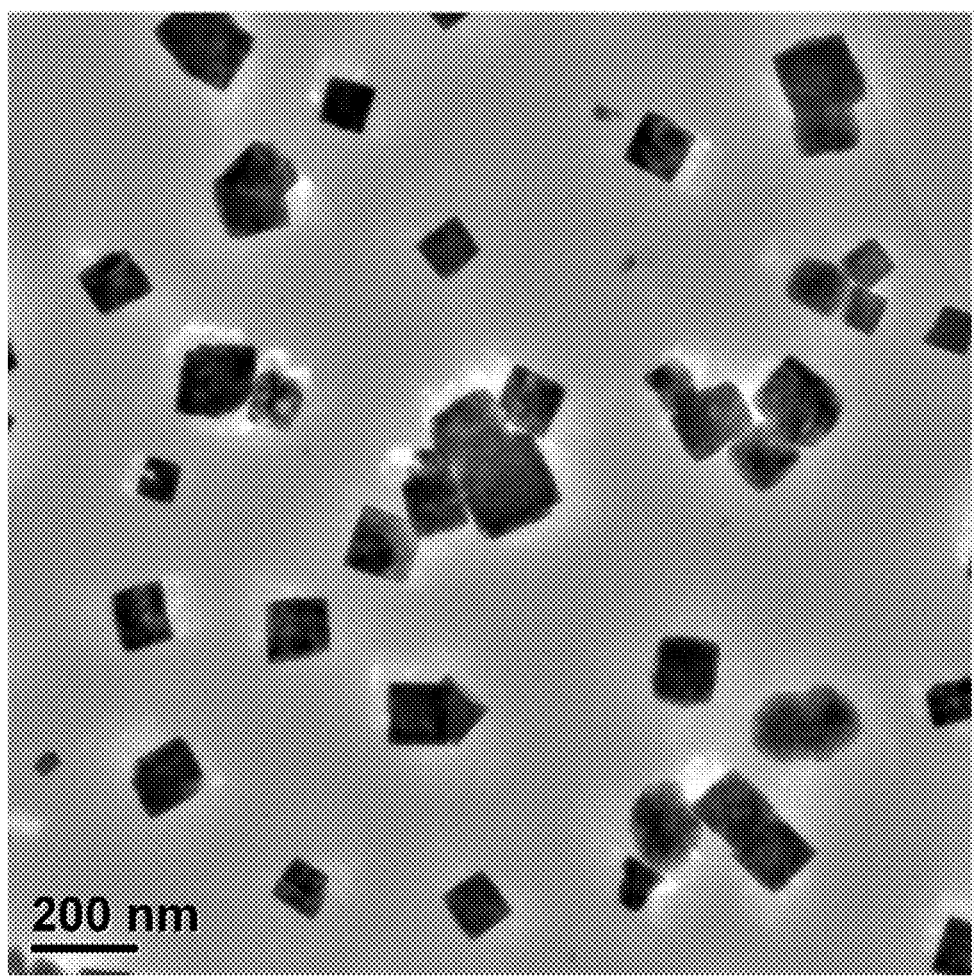
Figure 3:
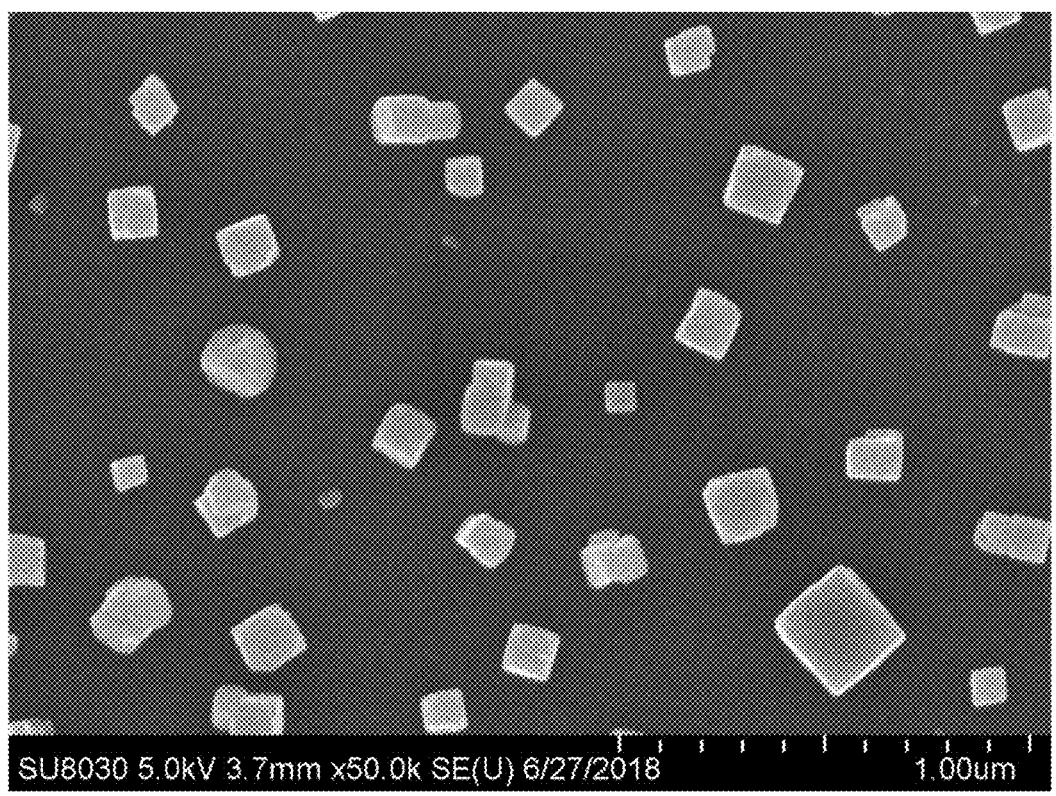
FIG. 3 depicts a scanning electron microscopy (SEM) micrograph of a cubiform ceria abrasive sample showing ceria abrasive particles having square faces.

FIGS. 1, 2, and 3 depict example cubiform ceria abrasive particles. These transmission electron microscopy (TEM) and scanning electron microscopy (SEM) images depict ceria abrasive particles having square faces. For example, in these images the depicted particle faces each include four edges having substantially the same length (e.g., within 20 percent of one another or even within 10 percent or less of one other). Moreover the edges meet at corners at approximately 90 degree angles (e.g., within a range from about 80 to 100 degrees or from about 85 to about 95 degrees). One of ordinary skill in the art will readily appreciate that in the TEM and SEM images a significant majority of the depicted abrasive particles are cubiform in that they have square faces as defined above. Some of the particles may be observed to include defects, for example, on one or more corners. Again, it will be understood that the term cubiform is not intended to describe ceria abrasive particles that are precisely cubic, but rather particles that are generally cubic in nature as described above and depicted in FIGS. 1, 2, and 3.

As used herein, a chemical mechanical polishing composition including a cubiform ceria abrasive is one in which at least 25 number percent of the abrasive particles are cubic in nature (cubic in form or shape as described above). In preferred embodiments, at least 40 number percent (e.g., at least 60 percent, or at least 80 percent) of the abrasive particles are cubic in nature. As noted above, the cubiform ceria abrasive particles may be readily evaluated and counted using TEM or SEM images, for example, at a magnification in a range from about 10,000× to about 500,000×. SEM or TEM images show abrasive particles having faces with four sides with similar length (e.g., within 20 percent of one another as described above). The images also show that adjacent sides are approximately perpendicular, for example, forming an angle of about 90 degrees (e.g., within a range from about 80 to about 100 degrees as also described above). To determine whether or not a ceria abrasive composition includes cubiform ceria abrasive particles, SEM or TEM observation shall be made on a large number of randomly selected particles (i.e., more than 200) so that it is possible to perform a statistical analysis and thereby determine a percentage of the particles that have a square face). The particles retained must be such that their images are well visible on the micrographs. Some of the particles may exhibit some defects either on their surface and/or one or more of their corners and still be counted as being cubiform.

The cubiform ceria abrasive particles may be substantially pure ceria abrasive particles (within normal tolerances for impurities) or doped ceria abrasive particles. Doped ceria abrasive particles may include interstitial dopants (dopants that occupy a space in the lattice that is not normally occupied) or substitutional dopants (dopants that occupy a space in the lattice normally occupied by cerium or oxygen atoms). Such dopants may include substantially any metal atom, for example, including Ca, Mg, Zn, Zr, Sc, or Y.

In certain advantageous embodiments, the dopants may include one or more Lanthanides, for example, including lanthanum, praseodymium, neodymium, promethium, samarium, and the like. In one particularly suitable embodiment, the cubiform ceria abrasive particles include a mixed oxide of cerium and lanthanum. The mixed oxide abrasive particles may have a molar ratio of La to (La+Ce) in range from about 0.01 to about 0.15, for example, from about 0.01 to about 0.12. It will be understood that such abrasive particles may additionally include other elements and/or oxides (e.g., as impurities). Such impurities may originate from the raw materials or starting materials used in the process of preparing the abrasive particles. The total proportion of the impurities is preferably less than 0.2% by weight of the particle. Residual nitrates are not considered as impurities.

In certain embodiments, the molar ratio of La to (La+Ce) may be in a range from about 0.01 to about 0.04 (e.g., from about 0.02 to about 0.03). In one such embodiment, the cubiform ceria abrasive particles include about 2.5 mole percent lanthanum oxide and about 97.5 mole percent cerium oxide. In other embodiments, the molar ratio may be in a range from about 0.08 to about 0.12 (e.g., from about 0.09 to about 0.11). In one such other embodiment the cubiform ceria abrasive particles include about 10 mole percent lanthanum oxide and about 90 mole percent cerium oxide. The abrasive particles may be a single phase solid solution with the lanthanum atoms substituting cerium atoms in the cerium oxide crystalline structure. In one embodiment, the solid solution exhibits a symmetrical x-ray diffraction pattern with a peak located between about 27 degrees and about 29 degrees that is shifted to a lower angle than pure cerium oxide. A solid solution may be obtained when the temperature of the aging sub-step (described below) is higher than about 60 degrees C. As used herein the term "solid solution" means that x-ray diffraction shows only the pattern of the cerium oxide crystal structure with or without shifts in the individual peaks but without additional peaks that would indicate the presence of other phases.

The cubiform ceria abrasive particles may also optionally be characterized by their specific surface area as determined on a powder by adsorption of nitrogen using the Brunauer-Emmett-Teller method (BET method). The method is disclosed in ASTM D3663-03 (reapproved 2015). The abrasive particles may have a specific surface area in a range from about 3 to about 14 $m^2/g$ (e.g., from about 7 to about 13 $m^2/g$ or from about 8 to about 12 $m^2/g$).

The cubiform ceria abrasive particles may optionally also be characterized by their average particle size and/or particle size distribution. The abrasive particles may have an average particle size in a range from about 50 nm to about 1000 nm (e.g., from about 80 nm to about 500 nm, from about 80 nm to about 250 nm, from about 100 nm to about 250 nm, or from about 150 nm to about 250 nm). Moreover, the average particle size may be greater than about 50 nm (e.g., greater than about 80 nm or greater than about 100 nm). The average particle size may be determined via dynamic light scattering (DLS) and corresponds to a median particle diameter (D50). DLS measurements may be made, for example, using a Zetasizer (available from Malvern Instruments). Those of ordinary skill in the art will readily appreciate that DLS measurements may significantly under count small particles when measured in the presence of comparatively larger particles. For the cubiform ceria abrasive particles disclosed herein the DLS technique tends to under count particles below about 40 nm. It will be understood that the disclosed embodiments may include a significant number of such small particles (less than 40 nm) that are not counted by DLS and therefore do not contribute to the average particles size.

Laser diffraction techniques may also optionally be used to characterize particle size distribution. Those of ordinary skill in the art will readily appreciate that laser diffraction techniques also tend to under count small particles (e.g., less than 40 nm in the disclosed embodiments). Laser diffraction measurements may be made, for example, using the Horiba LA-960 using a relative refractive index of 1.7. From the distribution obtained with laser diffraction measurements, various parameters may be obtained, for example, including D10, D50, D90, D99 and the dispersion index (defined below). Based on laser diffraction measurements, the abrasive particles may include a median diameter (D50) in a range from about 100 nm to about 700 nm (e.g., from about 100 nm to about 200 nm). For example, D50 may be in a range from about 100 nm to about 150 nm or from about 150 nm to about 200 nm. D50 is the median diameter determined from a distribution obtained by laser diffraction.

The cubiform ceria abrasive particles may optionally have a D10 in a range from about 80 nm to about 400 nm (e.g., from about 80 nm to about 250 nm, from about 80 nm to about 150 nm, or from about 100 nm to about 130 nm). It will be understood that D10 represents the particle diameter obtained by laser diffraction for which 10% of the particles have a diameter of less than D10.

The cubiform ceria abrasive particles may optionally have a D90 in a range from about 150 nm to about 1200 nm (e.g., from about 150 nm to about 1000 nm, from about 150 to about 750 nm, from about 150 to about 500 nm, from about 150 to about 300 nm, or from about 200 nm to about 300 nm). D90 represents the particle diameter obtained by laser diffraction for which 90% of the particles have a diameter of less than D90. Abrasive particles having undergone mechanical deagglomeration may have a D90 less than about 300 nm.

The cubiform ceria abrasive particles may optionally exhibit a low dispersion index. The "dispersion index" is defined by the following formula dispersion index=(D90-D10)/2·D50. The dispersion index may be less than about 0.60, for example (less than about 0.5, less than about 0.4, or less than about 0.30). Abrasive particles having undergone mechanical deagglomeration may have a dispersion index less than about 0.30. Moreover, D90/D50 may be in a range from about 1.3 to about 2 for particles having undergone mechanical deagglomeration.

The cubiform ceria abrasive particles may optionally have a D99 in a range from about 150 nm to about 3000 nm (e.g., from about 200 nm to about 2000 nm, from about 200 nm to about 1800 nm, from about 200 to about 1200, from about 200 to about 900, from about 200 nm to about 600 nm, from about 200 to about 500 nm, or from about 200 to about 400 nm). Abrasive particles having undergone mechanical deagglomeration may have a D99 less than about 600 nm (e.g., less than about 500 or less than about 400). D99 represents the particle diameter obtained by laser diffraction for which 99% of the particles have a diameter of less than D99.

The abrasive particles may be prepared using substantially any suitable methodology for producing cubiform ceria abrasive particles. The disclosed embodiments are directed to chemical mechanical polishing compositions including such abrasive particles and to methods for polishing substrates using such abrasive particles and are not limited to any particular methods for producing the particles. In certain embodiments, the cubiform ceria abrasive particles may be prepared by precipitating cerium nitrates (and optionally other nitrates when a doped ceria abrasive is prepared). The precipitated material may then be grown in a specific temperature and pressure regime to promote growth of cubiform ceria abrasive particles. These particles may then be cleaned and deagglomerated. A dispersion of the cubiform ceria abrasive particles may then be prepared and used to formulate the inventive chemical mechanical compositions.

In one advantageous embodiment cubiform cerium lanthanum oxide abrasive particles may be prepared by precipitating nitrates of cerium and of lanthanum. One such preparation method includes the following steps:
 (i) Mixing, under an inert atmosphere, an aqueous cerium nitrate solution and an aqueous base.
 (ii) Heating the mixture obtained in (i) under an inert atmosphere.
 (iii) Optionally acidifying the heat treated mixture obtained in (ii).
 (iv) Washing with water the solid material obtained in (ii) or (iii).
 (v) Mechanically treating the solid material obtained in (iv) to deagglomerate the ceria particles.

The cerium nitrate solution used in step (i) of the above methodology may be prepared by mixing aqueous solutions of cerium nitrates and lanthanum nitrates. The aqueous solution comprises $Ce^{III}$, $Ce^{IV}$ and $La^{III}$ and may be characterized by a $Ce^{IV}$ to total Ce molar ratio between about 1/(500,000) and about 1/(4,000). In one example embodiment the molar ratio may be between about 1/(100,000) and about 1/(90,000). It is generally advantageous to use salts and ingredients of a high purity, for example, having a purities of at least 99.5 weight percent or even 99.9 weight percent.

Step (i) includes mixing/reacting the aqueous cerium nitrate solution with an aqueous base. Bases of the hydroxide type may be advantageous, for example, including alkali metal or alkaline earth metal hydroxides and aqueous ammonia. Secondary, tertiary or quaternary amines may also be used. The aqueous solution of the base may also be degassed (deoxygenated) beforehand by bubbling with an inert gas. The mixing may be implemented by introducing the aqueous cerium nitrate solution into the aqueous base and is advantageously carried out under an inert atmosphere, for example, in a closed reactor or in a semi-closed reactor with inert gas (e.g., nitrogen or argon) purging. The mixing may also be carried out with stirring. The molar ratio of base to (Ce+La) may be between about 8.0 and about 30.0 (e.g., greater than about 9.0). Step (i) may further be carried out at a temperature between about 5 degrees C. and about 50 degrees C., for example, between about 20 degrees C. and 25 degrees C.

Step (ii) includes heating the mixture obtained at the end of the preceding step and may include a heating sub-step and an aging sub-step. The heating sub-step may include heating the mixture to a temperature in range from about 75 degrees C. to about 95 degrees C., for example, from about 85 degrees C. to about 90 degrees C. The aging sub-step may include maintaining (holding) the mixture at the temperature for a duration in a range from about 2 hours to about 20 hours. In general the aging time decreases with increasing temperature. Step (ii) may also be carried out under an inert atmosphere and stirring as described above for step (i).

In step (iii), the mixture obtained at the end of step (ii) may optionally be acidified, for example, using nitric acid. The heat treated reaction mixture may be acidified, for example, to a pH lower than about 3.0 (e.g., in a range from about 1.5 to about 2.5).

In step (iv), the solid material obtained in step (ii) or (iii) may be washed with water, (e.g., deionized water). The washing may be used to decrease residual nitrates in the final dispersion and to obtain a targeted conductivity. The washing may include filtering the solid from the mixture and redispersing the solid in water. Filtration and redispersion may be performed several times if necessary.

In step (v), the washed solid material obtained in (iv) may optionally be mechanically treated to deagglomerate or partially deagglomerate the ceria abrasive particles. Mechanical treatment may include, for example, double jet treatment or ultrasonic deagglomeration and usually results in a narrow particle size distribution and to a reduction of the number of large agglomerated particles.

After step (iv) or (v), the solid material may be dried to obtain the cerium-based particles in the powder form. The powder may be redispersed by adding water or a mixture of water and of a miscible liquid organic compound to obtain a dispersion of the cerium-based particles in a liquid medium. The liquid medium may be water or a mixture of water and of a water-miscible organic liquid. The water-miscible organic liquid may, for example, include an alcohol such as isopropyl alcohol, ethanol, 1-propanol, methanol, 1-hexanol; a ketone such as acetone, diacetone alcohol, methyl ethyl ketone; an ester such ethyl formate, propyl formate, ethyl acetate, methyl acetate, methyl lactate, butyl lactate, ethyl lactate. The proportion of water to organic liquid may be between 80 to 20 and 99 to 1 parts by weight. Moreover, the dispersion may include from about 1 weight percent to about 40 weight percent of the cerium-based particles, e.g., between about 10 weight percent and about 35 weight percent. The dispersion may also have a conductivity less than about 300 µS/cm, for example, less than about 150 more particularly lower than 150 µS/cm or less than about 100 µS/cm.

The polishing composition may include substantially any suitable amount of the cubiform ceria abrasive particles. For example, the polishing composition may include about 0.001 weight percent or more of the cubiform ceria abrasive particles at point of use (e.g., about 0.005 weight percent or more, about 0.01 weight percent or more, about 0.02 weight percent or more, about 0.05 weight percent or more, or about 0.1 weight percent or more). The polishing composition may include about 5 weight percent or less of the cubiform ceria abrasive particles at point of use (e.g., about 2 weight percent or less, about 1.5 weight percent or less, about 1 weight percent or less, or about 0.5 weight percent or less). It will be understood that the cubiform ceria abrasive particles may be present in the polishing composition at a concentration bounded by any two of the aforementioned endpoints. For example, the concentration of cubiform ceria abrasive particles in the polishing composition may be in a range from about 0.001 weight percent to about 5 weight percent at point of use (e.g., from about 0.01 weight percent to about 1 weight percent, from about 0.02 weight percent to about 1 weight percent, or from about 0.05 weight percent to about 0.5 weight percent).

An aqueous liquid carrier is used to facilitate the application of the abrasive and any optional chemical additives to the surface of the substrate to be polished (e.g., planarized). By aqueous it is meant that the liquid carrier is made up of at least 50 wt. % water (e.g., deionized water). The liquid carrier may include other suitable non-aqueous carriers, for example, including lower alcohols (e.g., methanol, ethanol, etc.) and ethers (e.g., dioxane, tetrahydrofuran, etc.). Preferably, the liquid carrier consists essentially of or consists of water, and more preferably deionized water.

The polishing composition is generally acidic, mildly acidic, or neutral having a pH in a range from about 2 to about 8. For example, the polishing composition may have a pH in a range from about 2 to about 7. In one embodiment, the polishing composition is acidic or mildly acidic having a pH in a range from about 3 to about 6 (e.g., from about 3 to about 5). For example, in one such mildly acidic embodiment, the pH may be about 4.

The polishing composition further includes an organic diacid. As used herein the term organic diacid refers to an organic compound (a carbon containing compound) having two acid groups. For example, an organic diacid may be a carboxylic acid having two carboxyl groups (COOH). Such a diacid may also be referred to as a dicarboxylic acid. The organic diacid may include substantially any suitable organic diacid, for example, including linear saturated dicarboxylic acids, unsaturated dicarboxylic acids, substituted dicarboxylic acids, aromatic dicarboxylic acids, or combinations thereof.

A linear saturated dicarboxylic acid has the general formula $HO_2C(CH_2)_nCO_2H$. By linear it is meant that the diacid is an unbranched straight chain acid. By saturated it is meant that the carbon-carbon bonds are all single bonds (i.e., there are no double or triple carbon-carbon bonds). The polishing composition may include substantially any suitable water soluble linear saturated dicarboxylic acid, for example, in which n is in a range from 1 to 8 (i.e., linear saturated dicarboxylic acids including from about 3 to about 10 carbon atoms). Such linear saturated dicarboxylic acids include malonic acid, succinic acid, glutaric acid, adipic acid, pimelic acid, suberic acid, azelaic acid, sebacic acid, or a combination thereof. Preferred linear saturated dicarboxylic acids include glutaric acid, adipic acid, pimelic acid, suberic acid, azelaic acid, sebacic acid, or a combination thereof (where n is from 3 to 8 such that the compound has from about 5 to about 10 carbon atoms). Most preferred linear saturated dicarboxylic acids include pimelic acid, suberic acid, azelaic acid, sebacic acid, or a combination thereof (where n is from 5 to 8 such that the compound has from about 7 to about 10 carbon atoms). For example, in one most preferred embodiment, the polishing composition may include suberic acid.

An unsaturated dicarboxylic acid is a dicarboxylic acid including at least one carbon-carbon double bond or carbon-carbon triple bond. The polishing composition may include substantially any suitable unsaturated dicarboxylic acid, for example, including monounsaturated, diunsaturated, or branched dicarboxylic acids. Example monounsaturated dicarboxylic acids include maleic acid, fumaric acid, and glutaconic acid. Example diunsaturated dicarboxylic acids include muconic acid isomers. Example branched dicarboxylic acids include citraconic acid, mesaconic acid, and itaconic acid.

A substituted dicarboxylic acid is a dicarboxylic acid including an OH, $NH_2$, O, Cl, alkane, alkene, or other side group, and/or an internal heteroatom substitution including N, O, S, or another heteroatom, and combinations thereof. The polishing composition may include substantially any suitable substituted dicarboxylic acid, for example, including malic acid, tartaric acid, aspartic acid, diglycolic acid, ketoglutaric acid, glutamic acid, glutathione, 1,3-acetonedicarboxylic acid, 1,3-adamantanedicarboxylic acid, bis(carboxymethyl)trithiocarbonate, chlorosuccinic acid, butylmalonic acid, 1,2-cyclohexanedicarboxylic acid, 1,3-cyclohexanedicarboxylic acid, cyclohexylsuccinic acid, trans-1,2-cyclopentanedicarboxylic acid, dibromomaleic acid, 2,3-dibromosuccinic acid, dimethylmalonic acid, ethylmalonic acid, iminodiacetic acid, mercaptosuccinic acid, 2-sulfobutanedioic acid, and 3-thiophenemalonic acid.

An aromatic dicarboxylic acid is a dicarboxylic acid including a carbon ring (e.g., a six carbon atom benzene ring). The polishing composition may include substantially any suitable aromatic dicarboxylic acid, for example, including the phthalic acid isomers, diphenic acid, naphthalene dicarboxylic acid, phenylenedipropionic acid, and 2,2'-Bipyridine-4,4'-dicarboxylic acid.

Those or ordinary skill in the art will readily appreciate that the aforementioned categories of organic diacids overlap such that some diacid compounds fall in two or more of the categories (e.g., substituted and aromatic). The polishing composition may also include such "multi-category" diacids, for example, including 5-tert-Butylisophthalic acid, 2,2'-Iminodibenzoic acid, 6-Methylpyridine-2,3-dicarboxylic acid, 4,4'-Oxybis(benzoic acid), and 3-Thiophenemalonic acid.

It will further be understood that in the above listed diacid compounds and categories one or more of the carboxyl groups may be substituted with another type of acid group, for example, including a sulfonic acid group or a phosphonic acid group. For example, the organic diacid may include carboxyl-PEG2-sulfonic acid and/or carboxyl-PEG2-phosphonic acid.

It will still further be understood that the organic diacid compound (or compounds) may be used in any accessible form, e.g., the conjugate acid or base and salt forms may be used instead of (or in addition to) the above recited acid(s).

The organic diacid may alternatively and/or additionally include polyethylene glycol diacid (PEG diacid). PEG diacid has the general formula: $HO_2CCH_2[OC_2H_4]_n CH_2CO_2H$. The PEG diacid may have substantially any suitable average molecular weight, for example, in a range from about 100 g/mol to about 100,000 g/mol (e.g., from about 100 g/mol to about 10,000 g/mol or about 100 g/mol to about 4000 g/mol). In one suitable embodiment, the PEG diacid has a molecular weight of about 600 g/mol.

The polishing composition may include substantially any suitable amount of the organic diacid. For example, the polishing composition may include about 0.1 millimoles per liter (mM) or more of the organic diacid at point of use (e.g., about 0.2 mM or more, about 0.3 mM or more, about 0.5 mM or more, about 0.8 mM or more, or about 1 mM or more). The polishing composition may include about 20 mM or less of the organic diacid at point of use (e.g., about 15 mM or less, about 10 mM or less, about 8 mM or less, about 5 mM or less, or about 3 mM or less). It will be understood that the organic diacid may be present in the polishing composition at a concentration bounded by any two of the aforementioned endpoints. For example, the concentration of organic diacid in the polishing composition may be in a range from about 0.1 mM to about 20 mM at point of use (e.g., from about 0.1 mM to about 15 mM, from about 0.2 mM to about 10 mM, from about 0.3 mM to about 8 mM, from about 0.5 mM to about 5 mM, or from about 1 mM to about 5 mM).

The polishing composition may optionally further include one or more additional components, for example, including various chemical additives. Such additives may, for example, associate with a surface of the cubiform ceria abrasive particles and/or with a surface of the polished substrate (e.g., via electrostatic interaction and/or hydrogen bonding). The chemical additive may be, for example, a dispersant, a rheology agent, a polishing rate accelerator, a polishing rate inhibitor, or a selectivity promoter (to improve the removal rate ratio of one material more than another). Such chemical additives may include, for example, a cationic surfactant, an anionic surfactant, a net neutral surfactant, a cationic polymer, an anionic polymer, and/or a nonionic polymer. It will be understood that the disclosed embodiments are not limited in regards the use of these optional additives.

Certain embodiments, particularly those intended for polishing carbon doped silicon oxide layers, may further include a polishing rate accelerator. Suitable polishing rate accelerators may include, for example, a carboxylic acid compound that activates the substrate. Example rate enhancers include picolinic acid, nicotinic acid, quinaldic acid, iso-nicotinic acid, acetic acid, and 4-hydroxybenzoic acid. In one advantageous embodiment disclosed below, the polishing rate accelerator includes picolinic acid.

The disclosed polishing compositions may further include an unsaturated carboxylic monoacid additive, for example to inhibit silicon nitride removal. Suitable unsaturated monoacids may include, for example, acrylic acid, 2-butenoic acid (crotonic acid), 2-pentenoic acid, trans-2-hexenoic acid, trans-3-hexenoic acid, 2-hexynoic acid, 2,4-hexadienoic acid, potassium sorbate, trans-2-methyl-2-butenoic acid, 3,3-dimethylacrylic acid, or a combination thereof, including stereoisomers thereof. Crotonic acid is included in one example embodiment disclosed below.

Certain embodiments of the disclosed polishing compositions may be used to polish carbon doped (e.g., highly carbon doped) silicon oxide layers. One advantageous embodiment includes cubiform ceria particles, a PEG diacid, and picolinic acid. The composition may further optionally include an unsaturated carboxylic monoacid such as crotonic acid.

The polishing composition may optionally further include a biocide. The biocide may include substantially any suitable biocide, for example an isothiazolinone biocide such as a methylisothiazolinone or a benzisothiazolone. The amount of biocide in the polishing composition at point of use is typically in a range from about 1 ppm by weight to about 100 ppm by weight at point of use, for example from about 5 ppm by weight to about 75 ppm by weight.

The polishing composition may be prepared using any suitable techniques, many of which are known to those skilled in the art. The polishing composition may be prepared in a batch or continuous process. Generally, the polishing composition may be prepared by combining the components thereof in any order. The term "component" as used herein includes the individual ingredients (e.g., the abrasive particles, the organic diacid, and any optional additives). For example, organic diacid may be added to the aqueous carrier (e.g., water) at the desired concentration(s). The pH may then be adjusted (as desired) and the cubiform ceria abrasive added at the desired concentration to obtain the polishing composition. The polishing composition may be prepared prior to use, with one or more components added to the polishing composition just before use (e.g., within about 1 minute before use, or within about 1 hour before use, or within about 1 or about 7 days before use). The polishing composition also may also be prepared by mixing the components at the surface of the substrate during the polishing operation (e.g., on the polishing pad).

In certain embodiments, the polishing composition may be provided as a "two-pack" system. For example, a first pack may include the cubiform ceria abrasive and other optional components and a second pack may include the organic diacid and still other optional components. The first and second packs may be shipped separately and combined prior to polishing (e.g., within one hour or one day of polishing) or on the polishing pad during the CMP operation.

The polishing composition of the invention may be provided as a concentrate which is intended to be diluted with an appropriate amount of water prior to use. In such an embodiment, the polishing composition concentrate may include the cubiform ceria abrasive particles, the organic diacid, and other optional additives in amounts such that, upon dilution of the concentrate with an appropriate amount of water each component of the polishing composition will be present in the polishing composition in an amount within the appropriate range recited above for each component. For example, the cubiform ceria abrasive particles, the organic diacid, and other optional additives may each be present in the polishing composition in an amount that is about 3 times (e.g., about 4 times, about 5 times, about 6 times, about 7 times, about 8 times, about 10 times, about 15 times, about 20 times, or about 25 times) greater than the point of use concentration recited above for each component so that, when the concentrate is diluted with an equal volume of (e.g., 2 equal volumes of water, 3 equal volumes of water, 4 equal volumes of water, 5 equal volumes of water, 5 equal volumes of water, 6 equal volumes of water, 7 equal volumes of water, 9 equal volumes of water, 14 equal volumes of water, 19 equal volumes of water, or 24 equal volumes of water), each component will be present in the polishing composition in an amount within the ranges set forth above for each component.

In embodiments in which the polishing composition is provided as a two-pack system, either or both of the packs may be provided as a concentrate and require dilution prior to mixing with the other pack. For example, in one embodiment, the first pack is provided as a concentrate such that it includes cubiform ceria abrasive particles at a concentration that is about 3 times (e.g., about 5 times, about 8 times, about 10 times, about 15 times, or about 20 times) greater than the point of use concentrations recited above. The concentrated first pack may be mixed with a suitable quantity of water prior to combining with the second pack. Likewise, the second pack may be provided as a concentrate such that it includes the organic diacid at a concentration that is about 3 times (e.g., about 5 times, about 8 times, about 10 times, about 15 times, or about 20 times) greater than point of use concentrations recited above. In such embodiments, the concentrated second pack may be mixed with a suitable quantity of water prior to combining with the first pack. In certain embodiments, both the first and second packs may be diluted with water prior to combining. The disclosed embodiments are not limited in these regards.

The polishing method of the invention is particularly suited for use in conjunction with a chemical mechanical polishing (CMP) apparatus, for example including a platen and a pad affixed thereto. As is known to those of ordinary skill in the art, polishing of the substrate takes place when the substrate is placed in contact with the polishing pad and the polishing composition of the invention and then the polishing pad and the substrate move relative to one another so as to abrade at least a portion of the substrate. The inventive method includes providing the inventive composition described above, contacting a substrate (e.g., a wafer) with the inventive composition, moving the polishing composition relative to the substrate, and abrading the substrate to remove a portion of at least one layer from the substrate and thereby polish the substrate.

The substrate generally includes a silicon oxide containing dielectric layer. For example, a dielectric material that includes silicon oxide or silicon oxide-based dielectric layer may comprise, consist of, or consist essentially of any one or more of: tetraethoxysilane (TEOS), high density plasma (HDP) oxide, phosphosilicate glass (PSG), borophosphosilicate glass (BPSG), high aspect ratio process (HARP) oxide, spin on glass dielectric (SOD) oxide (also sometimes referred to as spin on glass), chemical vapor deposition (CVD) oxide, plasma-enhanced tetraethyl ortho silicate (PE-TEOS), thermal oxide, or undoped silicate glass.

The polishing composition desirably exhibits a high removal rate when polishing a substrate including a silicon oxide material. For example, when polishing silicon wafers comprising high density plasma (HDP) oxides and/or plasma-enhanced tetraethyl ortho silicate (PETEOS), spin-on-glass (SOG), and/or tetraethyl orthosilicate (TEOS), the polishing composition desirably exhibits a silicon oxide removal rate of about 1000 Å/min or higher (e.g., about 2000 Å/min or higher, about 2,500 Å/min or higher, about 3,000 Å/min or higher, about 3,500 Å/min or higher, about 4000 Å/min or higher, about 4500 Å/min or higher, or about 5000 Å/min or higher).

In certain embodiments, the substrate includes polysilicon in combination with silicon oxide and/or silicon nitride. The polysilicon may be any suitable polysilicon, many of which are known in the art. The polysilicon may have any suitable phase and may be amorphous, crystalline, or a combination thereof.

The polishing composition desirably exhibits a low removal rate when polishing a substrate including polysilicon. For example, when polishing silicon wafers including a polysilicon layer, the polishing composition desirably exhibits a removal rate of polysilicon of less than about 500 Å/min, (e.g., less than about 200 Å/min, less than about 150 Å/min, less than about 100 Å/min, less than about 75 Å/min, less than about 50 Å/min, or less than about 25 Å/min).

In certain embodiments, the polishing composition may advantageously be used for stop-on-poly (SOP) applications such as for NAND flash applications. By "stop-on-poly" it is meant that the polishing composition exhibits a relatively low polysilicon removal rate and a relatively high silicon oxide removal rate. In other words, the polishing composition exhibits a high removal rate selectivity of silicon oxide to polysilicon. In example embodiments, the polishing composition may exhibit a silicon oxide to polysilicon selectivity of at least 40 to 1 (e.g., at least 50 to 1, at least 60 to 1, at least 80 to 1, at least 100 to 1, or even at least 150 to 1).

The polishing composition and method further desirably exhibit low dishing and erosion when polishing a substrate having a patterned silicon oxide layer. For example, when polishing patterned wafers including a silicon oxide material filled over polysilicon trenches, the polishing composition desirably exhibits erosion and dishing of less than about 200 Å (e.g., less than about 150 Å, less than about 100 Å, less than about 75 Å, or less than about 50 Å). Moreover, the polishing composition and method desirably achieve such erosion and dishing levels over a wide range line widths and pattern densities, for example, line widths ranging from 0.5 μm to 100 μm and pattern densities ranging from 10 percent to 90 percent.

The disclosed polishing compositions may further be used to polish carbon doped silicon oxide films (or substrates) such as highly carbon doped silicon oxide films (by highly doped it is meant that the material includes 50 mole percent or more carbon). In such applications, the polishing composition desirably exhibits a high removal rate when polishing a carbon doped silicon oxide material. For example, when polishing silicon wafers including such materials, the polishing composition may exhibit a silicon oxide removal rate of about 1000 Å/min or higher (e.g., about 1500 Å/min or higher, about 2,000 Å/min or higher, about 2,500 Å/min or higher, or about 3,000 Å/min or higher). Achieving such high removal rates on carbon doped silicon oxide materials (particularly highly carbon doped silicon oxide materials) is challenging in part due to the hydrophobicity of the surface. Certain disclosed embodiments including cubiform ceria particles may enable high removal rates of the carbon doped silicon oxide materials to be achieved even without the use of a wetting agent in the polishing composition.

It will be understood that the disclosure includes numerous embodiments. These embodiments include, but are not limited to, the following embodiments.

In a first embodiment a chemical mechanical polishing composition includes a liquid carrier; cubiform ceria abrasive particles dispersed in the liquid carrier; and an organic diacid.

A second embodiment may include the first embodiment wherein the cubiform ceria abrasive particles comprise a mixture of cerium oxide and lanthanum oxide.

A third embodiment may include any one of the first or second embodiments wherein the cubiform ceria abrasive particles have a molar ratio of lanthanum to lanthanum plus cerium in a range from about 1 to about 15 percent.

A fourth embodiment may include any one of the first through the third embodiments wherein the cubiform ceria abrasive particles have a BET surface area in a range from about 3 m²/g to about 14 m²/g.

A fifth embodiment may include any one of the first through the fourth embodiments wherein the cubiform ceria abrasive particles have an average particle size in a range from about 50 to about 500 nm.

A sixth embodiment may include any one of the first through the fifth embodiments comprising from about 0.01 to about 1 weight percent of the cubiform ceria abrasive particles.

A seventh embodiment may include any one of the first through the sixth embodiments wherein the diacid is a linear saturated dicarboxylic acid, an unsaturated dicarboxylic acid, a substituted dicarboxylic acid, or an aromatic dicarboxylic acid.

An eighth embodiment may include any one of the first through the seventh embodiments wherein the diacid comprises a linear saturated dicarboxylic acid.

A ninth embodiment may include any one of the first through the eighth embodiments wherein the diacid comprises glutaric acid, adipic acid, pimelic acid, suberic acid, azelaic acid, sebacic acid, or a combination thereof.

A tenth embodiment may include any one of the first through the ninth embodiments wherein the diacid comprises pimelic acid, suberic acid, azelaic acid, sebacic acid, or a combination thereof.

An eleventh embodiment may include any one of the first through the tenth embodiments wherein the diacid is suberic acid.

A twelfth embodiment may include any one of the first through the sixth embodiments wherein the diacid comprises a polyethylene glycol diacid.

A thirteenth embodiment may include the twelfth embodiment wherein the polyethylene glycol diacid has a molecular weight in a range from about 100 to about 1200 g/mol.

A fourteenth embodiment may include any one of the first through the thirteenth embodiments having a pH in a range from about 3 to about 5.

A fifteenth embodiment may include any one of the first through the fourteenth embodiments having at least 1 mM of the organic diacid at point of use.

A sixteenth embodiment may include any one of the first through the fifteenth embodiments, comprising from about 0.01 to about 1 weight percent of the cubiform ceria abrasive particles at point of use, wherein: (i) the cubiform ceria abrasive particles comprise a mixture of cerium oxide and lanthanum oxide and have an average particle size in a range from about 50 to about 500 nm; (ii) the organic diacid is suberic acid, a polyethylene glycol diacid, or a mixture thereof; and (iii) the composition has a pH in a range from about 3 to about 5.

A seventeenth embodiment may include the sixteen embodiment wherein the organic diacid is a polyethylene glycol diacid and the composition further comprises picolinic acid.

An eighteenth embodiment may include the seventeenth embodiment and may further comprise crotonic acid.

A nineteenth embodiment may include any one of the first through the eighteenth embodiments, further comprising at least one of a cationic surfactant, an anionic surfactant, a net neutral surfactant, a cationic polymer, an anionic polymer, a nonionic polymer, and a biocide.

A twentieth embodiment includes a method of chemical mechanical polishing a substrate including a silicon oxide dielectric material. The method includes: (a) providing the polishing composition of any one of the first through the nineteen embodiments; (b) contacting the substrate with said provided polishing composition; (c) moving said polishing composition relative to the substrate; and (d) abrading the substrate to remove a portion of the silicon oxide dielectric material from the substrate and thereby polish the substrate.

A twenty-first embodiment may include the twentieth embodiment wherein the substrate further comprises a polysilicon material and a removal rate selectivity of the silicon oxide material to the polysilicon material is greater than about 50:1 in (d).

A twenty-second embodiment may include the twentieth embodiment wherein the silicon oxide dielectric material is a carbon doped silicon oxide material and a removal rate carbon doped silicon oxide material is greater than about 1000 Å/min in (d).

A twenty-third embodiment may include the twenty-second embodiment wherein the carbon doped silicon oxide material includes greater than 50 mole percent carbon.

A twenty-fourth embodiment may include any one of the twentieth through the twenty-third embodiments wherein the diacid comprises a polyethylene glycol diacid.

A twenty-fifth embodiment may include the twenty-fourth embodiment wherein the polishing composition further comprises at least one of picolinic acid and crotonic acid.

A twenty-sixth embodiment may include any one of the twentieth through the twenty-fifth embodiments wherein said providing of any one of the first through the nineteen embodiments comprises (ai) providing a polishing concentrate and (aii) diluting the polishing concentrate with at least one part water to one part of the polishing concentrate to obtain the polishing composition.

A twenty-seventh embodiment may include any one of the twentieth through the twenty-sixth embodiments wherein said providing of any one of the first through the nineteen embodiments comprises (ai) providing first and second packs, the first pack including the cubiform ceria abrasive particles and the second pack including the diacid and (aii) combining the first and second packs to obtain the polishing composition.

A twenty-eighth embodiment may include the twenty-seventh embodiment wherein at least one of the first and second packs is diluted with water prior to combining in (aii).

The following examples further illustrate the invention but, of course, should not be construed as in any way limiting its scope. Various substrates were polished using an Applied Materials Mirra® polishing tool (available from Applied Materials, Inc.). Blanket wafers were polished for 60 seconds on the Mirra® at a platen speed of 100 rpm, a head speed of 85 rpm, a downforce of 3 psi, and a slurry flow rate of 150 ml/min. The wafers were polished on a NexPlanar® E6088 pad (available from Cabot Microelectronics Corporation) with in-situ conditioning using a Saesol DS8051 conditioner at 6 pounds downforce.

Blanket tetraethylorthosilicate (TEOS), high density plasma (HDP) oxide, and polysilicon wafers were polished in the Examples that follow. The TEOS wafers were obtained from WRS Materials and included a 20 kÅ TEOS layer. The HDP wafers were obtained from Silyb and included a 10 kÅ HDP oxide layer. The polysilicon wafers were obtained from WRS Materials and included a 10 kÅ polySi layer. Patterned HDP wafers were also polished in Examples 4 and 6. The patterned HDP wafers were obtained from Silyb and included STI1 4 kÅ HDP oxide with a 2 kÅ underlayer of polysilicon.

Example 1

A stock cerium oxide dispersion was prepared as follows. A cerium nitrate solution was prepared by combining 13.1 kg of a 3 M trivalent cerium(III) nitrate solution, 0.3 kg of a 3M lanthanum nitrate solution, 2.0 kg of a 68% nitric acid ($HNO_3$) solution, 0.5 kg deionized water, and cerium(IV) nitrate at a molar ratio of cerium(IV) to cerium(total) equal to 0.000055. The cerium nitrate solution was then degassed with agitation and nitrogen bubbling in a 20 L vessel.

An aqueous ammonia solution was prepared by combining 75 kg of deionized water and a solution of 13.1 kg of 25% aqueous ammonia (such that the molar ratio of $NH_4OH$ in the aqueous ammonia solution to the total cerium and lanthanum in the cerium nitrate solution was 9.0). The aqueous ammonia solution was then degassed with agitation and nitrogen bubbling in a 100 L vessel jacketed reactor.

The cerium nitrate solution was then added, at ambient temperature, to the aqueous ammonia solution with the same agitation under nitrogen purging. The temperature of the reaction mixture was then increased to 80° C. and held at that temperature for 18 hours. The reaction mixture was then left to cool and upon cooling was acidified to pH 2 by adding 68% nitric acid.

The reaction mixture was then filtrated and washed with deionized water. The washing was repeated when the conductivity of the washing solution was less than 0.04 mS/cm. Deionized water was added to adjust the final cerium oxide concentration to 10 weight percent. The cubiform ceria abrasive particles included 2.5 mole percent lanthanum oxide and 97.5 mole percent cerium oxide.

The BET specific surface area was determined by nitrogen adsorption to be 11.8 $m^2$ per gram. The average particle size was 102 nm as measured by Horiba 960 and 140 nm as measured by the Malvern Zetasizer.

Example 2

Two polishing compositions were tested to evaluate TEOS, HDP, and polysilicon polishing rates. Each composition was prepared by combining a first pack (the A pack) with deionized water and a corresponding second pack (the B pack). For composition 2A, the A pack included two weight percent of a control ceria (wet process ceria HC60™ commercially available from Rhodia) at pH 3.5. For composition 2B, the A pack included one part by weight of the stock ceria dispersion described above in Example 1 and four parts by weight deionized water. The ceria concentration was 2 weight percent and the pH was adjusted to 3.5. The B packs included 5 milliMolar (mM) suberic acid at pH 4.

One part of the A pack was first combined with 6 parts deionized water and then further combined with 3 parts of the B pack to obtain point of use compositions that included 0.2 weight percent ceria abrasive and 1.5 mM suberic acid. Blanket TEOS, HDP, and polysilicon (PolySi) wafers were polished for 60 seconds on a Mirra® tool at the conditions listed above. Polishing results are shown in Table 1. All removal rates (RR) are listed in angstroms per minute (Å/min).

TABLE 1

| Composition | TEOS RR | HDP RR | PolySi RR | TEOS:PolySi | HDP:PolySi |
| --- | --- | --- | --- | --- | --- |
| 2A | 2617 | 2537 | 54 | 48 | 47 |
| 2B | 4694 | 3740 | 36 | 130 | 104 |

As is readily apparent from the results set forth in Table 1 the cubiform ceria abrasive unexpectedly increased the TEOS removal rate by about 1.8× and the HDP removal rate by about 1.5× while also reducing the polysilicon removal rate by over 30 percent. As a result, the cubiform ceria abrasive significantly increased the TEOS and HDP removal rates while at the same time unexpectedly increasing the TEOS to polysilicon selectivity by 2.7× and the HDP to polysilicon selectivity by 2.2× (to over 100).

Example 3

Nine polishing compositions were tested to evaluate TEOS, HDP, and polysilicon polishing rates. Each composition was prepared by combining an A pack with deionized water and a corresponding B pack. For compositions 3A-3D, the A pack included two weight percent of the control ceria described above in Example 2 at pH 3.5. For compositions 3E-3I, the A pack included one part by weight of the stock ceria dispersion described above in Example 1 and four parts by weight deionized water. The ceria concentration was 2 weight percent and the pH was adjusted to 3.5. The B packs included 5 mM succinic acid (3A and 3E), 5 mM glutaric acid (3B and 3F), 5 mM pimelic acid (3C and 3G), and 5 mM suberic acid (3D and 3H) at pH 4. The B pack for composition 3I included deionized water adjusted to pH 4.

One part of the A pack was first combined with 6 parts deionized water and then further combined with 3 parts of the B pack to obtain point of use compositions that included 0.2 weight percent ceria abrasive and 1.5 mM diacid (with the exception of composition 3I which didn't include a diacid).

For compositions 3A-3D, blanket TEOS and polysilicon wafers were polished for 60 seconds on a Mirra® tool at the conditions listed above. For compositions 3E-3I, blanket TEOS and HDP wafers were polishing on a Logitech bench top polishing tool at 3 psi downforce, 88 rpm platen speed, 85 rpm head speed, and a slurry flow rate of 50 ml/min on the E6088 pad. The pad was conditioned in-situ using a Saesol DS8051 conditioner at 6 pounds downforce. Polishing results are shown in Tables 2A and 2B. All removal rates (RR) are listed in angstroms per minute (Å/min).

TABLE 2A

| Composition | Diacid | TEOS RR | PolySi RR | TEOS:PolySi |
| --- | --- | --- | --- | --- |
| 3A | Succinic | 3121 | 950 | 3 |
| 3B | Glutaric | 2615 | 871 | 3 |
| 3C | Pimelic | 2813 | 170 | 17 |
| 3D | Suberic | 1730 | 33 | 52 |

TABLE 2B

| Composition | Diacid | TEOS RR | HDP RR |
| --- | --- | --- | --- |
| 3E | Succinic | 1242 | 1295 |
| 3F | Glutaric | 2533 | 2266 |
| 3G | Pimelic | 3116 | 2691 |
| 3H | Suberic | 2531 | 2311 |
| 3I | None | 3905 | 2596 |

As is readily apparent from the results set forth in Table 2A and 2B the TEOS removal rate increases with increasing number of carbon atoms in the diacid (pimelic>glutaric>succinic) with cubiform abrasive ceria while the TEOS removal rate generally decreases with increasing number of carbon atoms in the diacid (succinic>glutaric/pimelic>suberic) with the control wet ceria. The compositions including the cubiform ceria abrasive are therefore expected to advantageously achieve significantly higher removal rates and TEOS to polysilicon selectivity as compared to those using the control wet ceria. It will be appreciated that compositions including the cubiform ceria abrasive (particularly 3G and 3H) exhibited a significant increase in TEOS removal rate even though they were tested on the Logitech polishing tool which is known to suppress removal rates as compared to the Mirra® tool.

Example 4

Two polishing compositions were tested to evaluate TEOS, HDP, and polysilicon polishing rates on blanket wafers as well as erosion, dishing, and polysilicon loss on patterned wafers. Each composition was prepared by combining an A pack with deionized water and a corresponding B pack. For composition 2A, the A pack included two weight percent of the control ceria described above in Example 2 at pH 3.5. For composition 2B, the A pack included one part by weight of the stock ceria dispersion described above in Example 1 and four parts by weight deionized water. The ceria concentration was 2 weight percent and the pH was adjusted to 3.5. The B packs included 3.3 mM polyethylene glycol diacid 600 at pH 4.0.

One part of the A pack was first combined with 6 parts deionized water and then further combined with 3 parts of the B pack to obtain point of use compositions that included 0.2 weight percent ceria abrasive and 1.0 mM polyethylene glycol diacid 600.

Blanket TEOS, HDP, and polysilicon wafers were polished for 60 seconds on a Mirra® tool at the conditions listed above. Pattern wafers were polished to endpoint plus 100% at the same conditions. Polishing results are shown in Tables 3A and 3B. All removal rates (RR) are listed in angstroms per minute (Å/min). Dishing, Erosion, and polysilicon (PolySi) loss are listed in angstroms (Å) for a number of different line patterns (in which the first number refers to the line width in microns and the second number refers to the pattern density).

TABLE 3A

Blanket Wafer Data

| Composition | TEOS RR | HDP RR | PolySi RR | TEOS:PolySi | HDP:PolySi |
|---|---|---|---|---|---|
| 4A | 2579 | 1993 | 79 | 33 | 25 |
| 4B | 3880 | 3407 | 66 | 59 | 52 |

TABLE 3B

Pattern Wafer Data

| Pattern Metric | Pattern Structure | Composition 4A | Composition 4B |
|---|---|---|---|
| PolySi Loss | Cell D | 13 | 8 |
| Erosion | Cell D | 36 | 10 |
| Dishing | Cell D | 0 | 0 |
| PolySi Loss | L5-10 | 15 | 17 |
| Erosion | L5-10 | 96 | 75 |
| Dishing | L5-10 | 26 | 37 |
| PolySi Loss | LY50-50 | 14 | 9 |
| Erosion | LY50-50 | 17 | 15 |
| Dishing | LY50-50 | 96 | 65 |
| PolySi Loss | LY100-50 | 14 | 13 |
| Dishing | LY100-50 | 140 | 106 |

As is readily apparent from the results set forth in Tables 3A and 3B, the cubiform ceria abrasive unexpectedly increased the TEOS removal rate by about 1.5× and the HDP removal rate by about 1.7× while also reducing the polysilicon removal rate by over 15 percent. As a result, the cubiform ceria significantly increased the TEOS and HDP removal rates while at the same time increasing the TEOS to polysilicon selectivity by almost 2× and the HDP to polysilicon selectivity by over 2×. Moreover, composition 4B, including the cubiform ceria abrasive, had generally superior topography performance (including erosion, dishing, and PolySi loss) as compared to the composition including the control wet ceria. Such improved topography is significantly advantageous and unexpected as higher TEOS removal rates are generally well known to degrade the topography performance of a polishing composition.

Example 5

Six polishing compositions were tested to evaluate TEOS, HDP, and polysilicon polishing rates on blanket wafers. Each composition was prepared by combining an A pack with deionized water and a corresponding B pack. For compositions 5A, 5C, and 5E, the A pack included two weight percent of the control ceria described above in Example 2 at pH 3.5. For compositions 5B, 5D, and 5F the A pack included one part by weight of the stock ceria dispersion described above in Example 1 and four parts by weight deionized water. The ceria concentration was 2 weight percent and the pH was adjusted to 3.5. The B packs included 3.3 mM polyethylene glycol diacid (molecular weight about 600 g/mol) (5A and 5B), 6.6 mM polyethylene glycol diacid 600 (5C and 5D), or 10 mM polyethylene glycol diacid 600 (5E and 5F) at pH 4.

One part of the A pack was first combined with 6 parts deionized water and then further combined with 3 parts of the B pack to obtain point of use compositions that included 0.2 weight percent ceria abrasive. The point of use diacid concentrations are listed in Table 4A.

TABLE 4A

| Composition | Ceria | PEG Diacid (mM) |
|---|---|---|
| 5A | Control | 1 |
| 5B | Cubiform | 1 |
| 5C | Control | 2 |
| 5D | Cubiform | 2 |
| 5E | Control | 3.3 |
| 5F | Cubiform | 3.3 |

Blanket TEOS, HDP, and polysilicon wafers were polished for 60 seconds on a Mirra® tool at the conditions listed above. Polishing results are shown in Table 4B. All removal rates (RR) are listed in angstroms per minute (Å/min).

TABLE 4B

| Composition | TEOS RR | HDP RR | PolySi RR | TEOS:PolySi | HDP:PolySi |
|---|---|---|---|---|---|
| 5A | 2579 | 1993 | 79 | 33 | 25 |
| 5B | 3880 | 3407 | 66 | 59 | 52 |
| 5C | 1069 | 878 | 44 | 24 | 20 |
| 5D | 2358 | 2356 | 58 | 41 | 41 |
| 5E | 476 | 332 | 32 | 15 | 10 |
| 5F | 1051 | 1003 | 43 | 24 | 23 |

As is readily apparent from the results set forth in Table 4B, the compositions including the cubiform ceria abrasive (5B, 5D, and 5E) are able to generate high TEOS and HDP removal rates and high selectivity to polysilicon at higher diacid loading. At 2 mM of diacid (5C and 5D), the cubiform ceria abrasive increased TEOS and HDP removal rates by about 2.2× and 2.7×. Moreover, the compositions including the cubiform ceria abrasive exhibited superior oxide (TEOS and HDP) to polysilicon selectivity at all diacid loadings.

Example 6

Six polishing compositions were tested to evaluate HDP and polysilicon polishing rates on blanket wafers and dishing and erosion on patterned wafers. Each composition was prepared by combining an A pack with deionized water and a corresponding B pack. The A pack for composition 6A included two weight percent of the control ceria described above in Example 2 at pH 3.5. The A pack for each of compositions 6B-6F was made using the stock ceria dispersion described above in Example 1 and deionized water. The ceria concentrations were 0.5 weight percent (6B and 6C), 1.25 weight percent (6D), or 2 weight percent (6E and 6F) and the pH was adjusted to 3.5. The B pack for composition 6A included 5 mM polyethylene glycol diacid (molecular weight about 600 g/mol) at pH 4. The B packs for compositions 6B-6F included 5 mM (6B and 6E) 6.25 mM (6D) or 7.5 mM (6C and 6F) suberic acid at pH 4.

One part of the A pack was first combined with 6 parts deionized water and then further combined with 3 parts of the B pack to obtain point of use compositions that are listed in Table 5A.

TABLE 5A

| Composition | Ceria (weight percent) | DiAcid (mM) |
|---|---|---|
| 6A | 0.2 | 1.5 PEG 600 |
| 6B | 0.05 | 1.5 Suberic |
| 6C | 0.05 | 2.25 Suberic |
| 6D | 1.25 | 1.875 Suberic |
| 6E | 0.2 | 1.5 Suberic |
| 6F | 0.2 | 2.25 Suberic |

Blanket HDP and polysilicon wafers were polished for 60 seconds on a Mirra® tool at the conditions listed above. Pattern wafers were polished to endpoint plus 100% at the same conditions. Polishing results are shown in Tables 5B and 5C. All removal rates (RR) are listed in angstroms per minute (Å/min). Dishing, Erosion are listed in angstroms (Å).

TABLE 5B

| Composition | HDP RR | PolySi RR | HDP:PolySi |
|---|---|---|---|
| 6A | 2568 | 37 | 69 |
| 6B | 2705 | 12 | 225 |
| 6C | 1696 | 7 | 242 |
| 6D | 3639 | 20 | 182 |
| 6E | 4550 | 57 | 80 |
| 6F | 3740 | 36 | 104 |

TABLE 5C

| | Dishing (Å) | | | Erosion (Å) | | |
|---|---|---|---|---|---|---|
| Composition | Cell-D | L5-10 | LY50-50 | LY100-50 | Cell-D | L5-10 | L50-50 |
| 6A | 38 | 11 | 45 | 103 | 11 | 28 | 9 |
| 6B | 7 | 10 | 18 | 16 | -3 | 0 | -6 |
| 6C | 7 | -17 | 11 | 16 | -3 | 7 | 1 |
| 6D | 11 | -13 | 14 | 42 | -2 | -14 | -17 |
| 6D (2x OP) | 10 | 17 | 15 | 35 | 3 | 13 | -5 |
| 6E | 8 | 10 | 38 | 62 | -4 | 37 | 14 |
| 6F | 7 | 9 | 22 | 17 | 5 | 14 | 4 |

As is readily apparent from the results set forth in Tables 5B and 5C, the compositions including the cubiform ceria abrasive particles exhibit high HDP removal rates and very high HDP to polysilicon selectivity (>200) at very low abrasive loading (0.05 weight percent in 6B). At higher abrasive loading (0.2 weight percent in 6E and 6F), very high HDP removal rates were observed with HDP to polysilicon selectivities of about 100. Composition 6D exhibited both high HDP removal rates and high HDP to polysilicon selectivity. Improved topography (dishing and erosion as compared to control 6A) was observed for all compositions across all features (with few exceptions). Composition 6D in particular exhibited significantly improved topography at every feature. Even with a 200 percent over polish (OP), composition 6D was superior to the control. As noted above in Example 4, such improved topography is significantly advantageous and unexpected as higher oxide removal rates are generally well known to degrade the topography performance of a polishing composition.

Example 7

Two polishing compositions were tested to evaluate the polishing rates on carbon doped spin on glass (SOG) low-k dielectrics. Compositions 7A and 7B were prepared by combining an A pack and a B pack in a 1:1 ratio such that the point of use concentrations were one half those listed below for the individual packs. The A packs included 0.5 weight percent ceria abrasive, 389 ppm by weight picolinic acid, and 14 ppm Kordek MLX biocide and had a pH of 4. Composition 7A included the control ceria described above in Example 2. Composition 7B included the cubiform ceria abrasive particles prepared as described above in Example 1. Each of the B packs included 117 ppm by weight polyethylene glycol diacid (molecular weight about 600 g/mol), 117 ppm by weight crotonic acid, and 83 ppm by weight Kordek MLX biocide and had a pH of 4. The B pack for composition 7A further included 233 ppm by weight GPoly OKS-1180 (a butanediol vinyl alcohol co-polymer available from Mitsubishi Chemical).

Substrates including carbon doped silicon dioxide SOG layers were obtained from Brewer Science and were polished on a Logitech bench top polishing tool at 1.5 psi downforce, 88 rpm platen speed, 85 rpm head speed, and a slurry flow rate of 50 ml/min on the E6088 pad. The pad was conditioned in-situ using a Saesol DS8051 conditioner at 6 pounds downforce. Polishing results are shown in Table 6. All removal rates (RR) are listed in angstroms per minute (Å/min). The carbon doped silicon dioxide SOG layers included a range of carbon doping levels, from 68-72 percent carbon to 90-95 percent carbon, and were heat treated using low, medium, or high temperature. A control material included essentially no carbon.

TABLE 6

| Wafer Type % Carbon/Heat Treatment | Composition 7A Control Ceria | Composition 7B Cubiform Ceria Abrasive |
|---|---|---|
| 0% C/Low Temp | 4012 | 4324 |
| 90-95% C/High Temp | 168 | 660 |
| 90-95% C/Med Temp | 1379 | 2536 |
| 76-80% C/High Temp | 1034 | 1751 |
| 76-80% C/Med Temp | 3485 | 3992 |
| 80-85% C/Low Temp | 1028 | 1685 |
| 68-72% C/Low Temp | 266 | 617 |

It is readily apparent from the data set forth in Table 6 that composition 7B exhibited significantly improved removal rate across a wide range of highly carbon doped silicon oxide films. The removal rate improvement ranged from about 15 percent to about 290 percent depending on film type. Moreover, composition 7B advantageously achieved the improved rate without the use of the butanediol vinyl alcohol co-polymer used in composition 7A.

Example 8

Three polishing compositions were tested to evaluate the effect of lanthanum doping level in the cubiform ceria abrasive particles on the TEOS removal rate. Composition 8A included 0.28 weight percent of a control ceria (wet process ceria HC60™ commercially available from Rhodia). Composition 8B included 0.28 weight percent cubiform ceria abrasive particles including 2.5 mole percent lanthanum oxide and was prepared by diluting the stock ceria dispersion described above in Example 1 with 34 parts water to 1 part stock ceria dispersion. Composition 8C included 0.28 weight percent cubiform ceria abrasive particles including 10 mole percent lanthanum oxide and was prepared by diluting the ceria dispersion described in the following paragraphs with 34 parts water to 1 part ceria dispersion. Each of compositions 8A-8C had a pH of 4.

A cerium oxide dispersion was prepared as follows. A cerium nitrate solution was prepared by combining 11.5 kg of a 3M trivalent cerium(III) nitrate solution, 1.3 kg of a 3M lanthanum nitrate solution, 1.86 kg of a 68% nitric acid ($HNO_3$) solution, 0.5 kg deionized water, and cerium(IV) nitrate at a molar ratio of cerium(IV) to cerium(total) equal to 0.0000125 (1/80,235). The cerium nitrate solution was then degassed with agitation and nitrogen bubbling in a 20 L vessel.

An aqueous ammonia solution was prepared by combining 70 kg of deionized water and a solution of 14 kg of 25% aqueous ammonia (such that the molar ratio of $NH_4OH$ in the aqueous ammonia solution to the total cerium and lanthanum in the cerium nitrate solution was 10). The aqueous ammonia solution was then degassed with agitation and nitrogen bubbling in a 100 L vessel jacketed reactor.

The cerium nitrate solution was then added, at ambient temperature, to the aqueous ammonia solution with the same agitation under nitrogen purging. The temperature of the reaction mixture was then increased to 88° C. and held at that temperature for 13.5 hours. The reaction mixture was then left to cool and upon cooling was acidified to pH 2 by adding 68% nitric acid.

The reaction mixture was then filtrated and washed with deionized water. The washing was repeated when the conductivity of the washing solution was less than 0.04 mS/cm. Deionized water was added to adjust the final cubiform ceria abrasive concentration to 10 weight percent. The cubiform ceria abrasive particles included 10 mole percent lanthanum oxide and 90 mole percent cerium oxide.

The BET specific surface area was determined by nitrogen adsorption to be 8.6 $m^2$ per gram. The average particle size was 142 nm as measured by Malvern Zetasizer.

Blanket TEOS wafers were polished for 60 seconds on a Mirra® tool at the conditions listed above. Polishing results are shown in Table 7. All removal rates (RR) are listed in angstroms per minute (Å/min).

TABLE 7

| Composition | Abrasive | TEOS RR |
| --- | --- | --- |
| 8A | Control Ceria | 3819 |
| 8B | Cubiform Ceria with 2.5% La | 6388 |
| 8C | Cubiform Ceria with 10% La | 6285 |

As is readily apparent from the data set forth in Table 7, compositions 8B and 8C exhibited equivalent TEOS removal rates that are greater than 1.6× the removal rate of composition 8A.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that the disclosure includes numerous embodiments beyond those included above in the Examples. These embodiments include, but are not limited to the embodiments listed in the appended claims.

The invention claimed is:

1. A chemical mechanical polishing composition comprising:
   a liquid carrier;
   about 0.05 to about 0.5 weight percent of cubiform ceria abrasive particles dispersed in the liquid carrier; and
   an organic diacid.

2. The composition of claim 1, wherein the cubiform ceria abrasive particles comprise a mixture of cerium oxide and lanthanum oxide.

3. The composition of claim 1, wherein the cubiform ceria abrasive particles have a molar ratio of lanthanum to lanthanum plus cerium in a range from about 1 to about 15 percent.

4. The composition of claim 1, wherein the cubiform ceria abrasive particles have a BET surface area in a range from about 3 $m^2/g$ to about 14 $m^2/g$.

5. The composition of claim 1, wherein the cubiform ceria abrasive particles have an average particle size in a range from about 50 to about 500 nm.

6. The composition of claim 1, wherein the organic diacid is a linear saturated dicarboxylic acid, an unsaturated dicarboxylic acid, a substituted dicarboxylic acid, or an aromatic dicarboxylic acid.

7. The composition of claim 6, wherein the organic diacid comprises a linear saturated dicarboxylic acid.

8. The composition of claim 7, wherein the organic diacid comprises glutaric acid, adipic acid, pimelic acid, suberic acid, azelaic acid, sebacic acid, or a combination thereof.

9. The composition of claim 7, wherein the organic diacid comprises pimelic acid, suberic acid, azelaic acid, sebacic acid, or a combination thereof.

10. The composition of claim 7, wherein the organic diacid is suberic acid.

11. The composition of claim 1, wherein the organic diacid comprises a polyethylene glycol diacid.

12. The composition of claim 11, wherein the polyethylene glycol diacid has a molecular weight in a range from about 100 to about 1200 g/mol.

13. The composition of claim 1, having a pH in a range from about 3 to about 5.

14. The composition of claim 1, comprising at least 1 mM of the organic diacid at point of use.

15. The composition of claim 1, wherein:
the cubiform ceria abrasive particles comprise a mixture of cerium oxide and lanthanum oxide and have an average particle size in a range from about 50 to about 500 nm;
the organic diacid is a polyethylene glycol diacid; the composition further comprises picolinic acid and crotonic acid; and
the composition has a pH in a range from about 3 to about 5.

16. The composition of claim 1, further comprising at least one of a cationic surfactant, an anionic surfactant, a net neutral surfactant, a cationic polymer, an anionic polymer, a nonionic polymer, and a biocide.

* * * * *